United States Patent
Rau et al.

(10) Patent No.: US 11,821,444 B2
(45) Date of Patent: Nov. 21, 2023

(54) PISTON AND A FLUID-ACTUATED WORKING CYLINDER PROVIDED THEREWITH

(71) Applicant: Festo SE & Co. KG, Esslingen (DE)

(72) Inventors: Michael Rau, Hattenhofen (DE); Stephan Widmayer, Spiesen-Elversberg (DE); Nenad Bartolic, Böblingen (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 17/838,330

(22) Filed: Jun. 13, 2022

(65) Prior Publication Data

US 2022/0397132 A1    Dec. 15, 2022

(30) Foreign Application Priority Data

Jun. 11, 2021  (DE) ...................... 10 2021 205 951.1

(51) Int. Cl.
*F15B 15/14*      (2006.01)
*F15B 15/22*      (2006.01)
(Continued)

(52) U.S. Cl.
CPC ...... *F15B 15/1452* (2013.01); *F15B 15/1471* (2013.01); *F15B 15/226* (2013.01);
(Continued)

(58) Field of Classification Search
CPC ................ F15B 15/1452; F15B 15/226; F15B 15/2861; F16J 1/006; F16J 1/008; F16J 15/3232; F16J 15/328
See application file for complete search history.

(56) References Cited

U.S. PATENT DOCUMENTS 315,115  A  *  4/1885  Brandon .................. F16J 1/006
                                                92/185
2,402,268  A  *  6/1946  Young ........................ F16J 1/02
                                                92/244
(Continued)

FOREIGN PATENT DOCUMENTS

DE    2163840 A1    6/1973
DE    2947516 B1    1/1981
(Continued)

OTHER PUBLICATIONS

DE-02017206297 A1 machine translation (Year: 2018).*
DE 19925083 A1 machine translation (Year: 2000).*

*Primary Examiner* — Kenneth Bomberg
*Assistant Examiner* — Matthew Wiblin
(74) *Attorney, Agent, or Firm* — Hoffmann & Baron, LLP

(57) ABSTRACT

A piston for a fluid-actuated working cylinder, with a piston base unit which is coaxial to a piston longitudinal axis, consisting of a rigid core body which has radial outer peripheral surface and of an annular filling body which is seated in an annular receiving groove. The receiving groove is coaxial to the piston longitudinal axis and in the region of the radial outer peripheral surface is designed with a radially outwardly facing groove opening in the core body. The piston further includes a ring element which consists of plastic. The ring element radially outwardly coaxially encompasses the piston base unit at least in the region of the filling body, being radially supported with a radial inner peripheral surface on the piston base unit, projecting radially beyond the radial outer peripheral surface of the core body and comprising an axially orientated axial support surface radially outside the piston base unit on its two axial face sides. The piston further includes an annular enveloping body which has rubber elastic characteristics.

21 Claims, 3 Drawing Sheets

(51) Int. Cl.
   *F15B 15/28*    (2006.01)
   *F16J 1/00*    (2006.01)
   *F16J 15/328*    (2016.01)
   *F16J 15/3232*    (2016.01)

(52) U.S. Cl.
   CPC ........... *F15B 15/2807* (2013.01); *F16J 1/005* (2013.01); *F16J 1/006* (2013.01); *F16J 1/008* (2013.01); *F16J 15/328* (2013.01); *F16J 15/3232* (2013.01)

(56) References Cited

U.S. PATENT DOCUMENTS

| | | | | |
|---|---|---|---|---|
| 2,487,390 | A | * 11/1949 | Smith | F04B 53/143 |
| | | | | 92/254 |
| 2,984,529 | A | * 5/1961 | Dailey | F04B 53/143 |
| | | | | 277/567 |
| 4,378,726 | A | 4/1983 | Stoll | |
| 5,813,313 | A | 9/1998 | Stoll et al. | |
| 2007/0279045 | A1 | * 12/2007 | Rau | F15B 15/2861 |
| | | | | 324/207.11 |

FOREIGN PATENT DOCUMENTS

| | | | | |
|---|---|---|---|---|
| DE | 19715858 | A1 | 11/1997 | |
| DE | 19925083 | A1 | 12/2000 | |
| DE | 10334205 | A1 | 2/2005 | |
| DE | 102017206297 | A1 * | 10/2018 | ......... F15B 15/1428 |
| DE | 102017206298 | A1 | 10/2018 | |
| EP | 0093859 | A2 | 11/1983 | |

\* cited by examiner

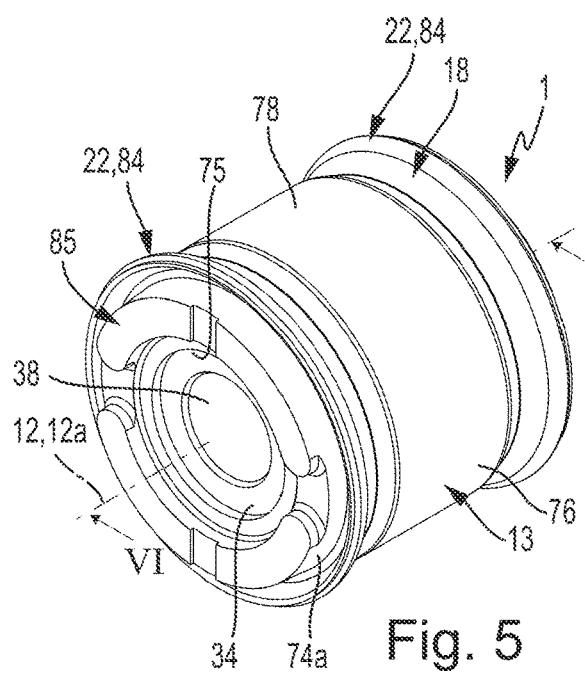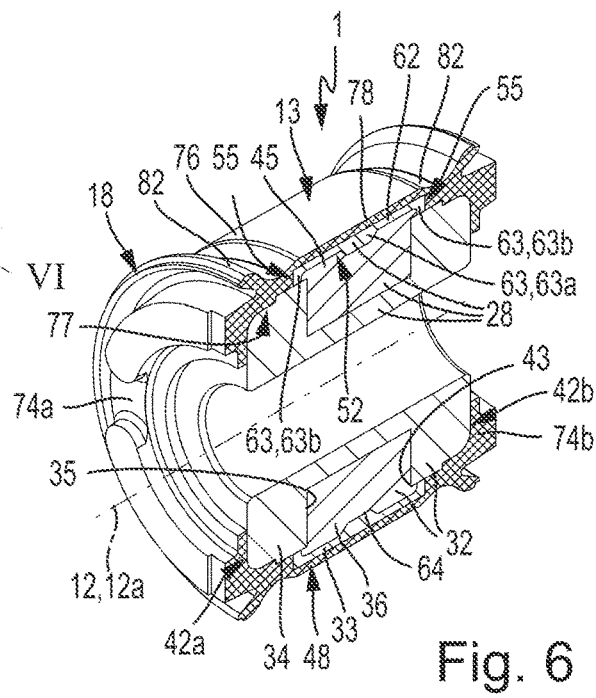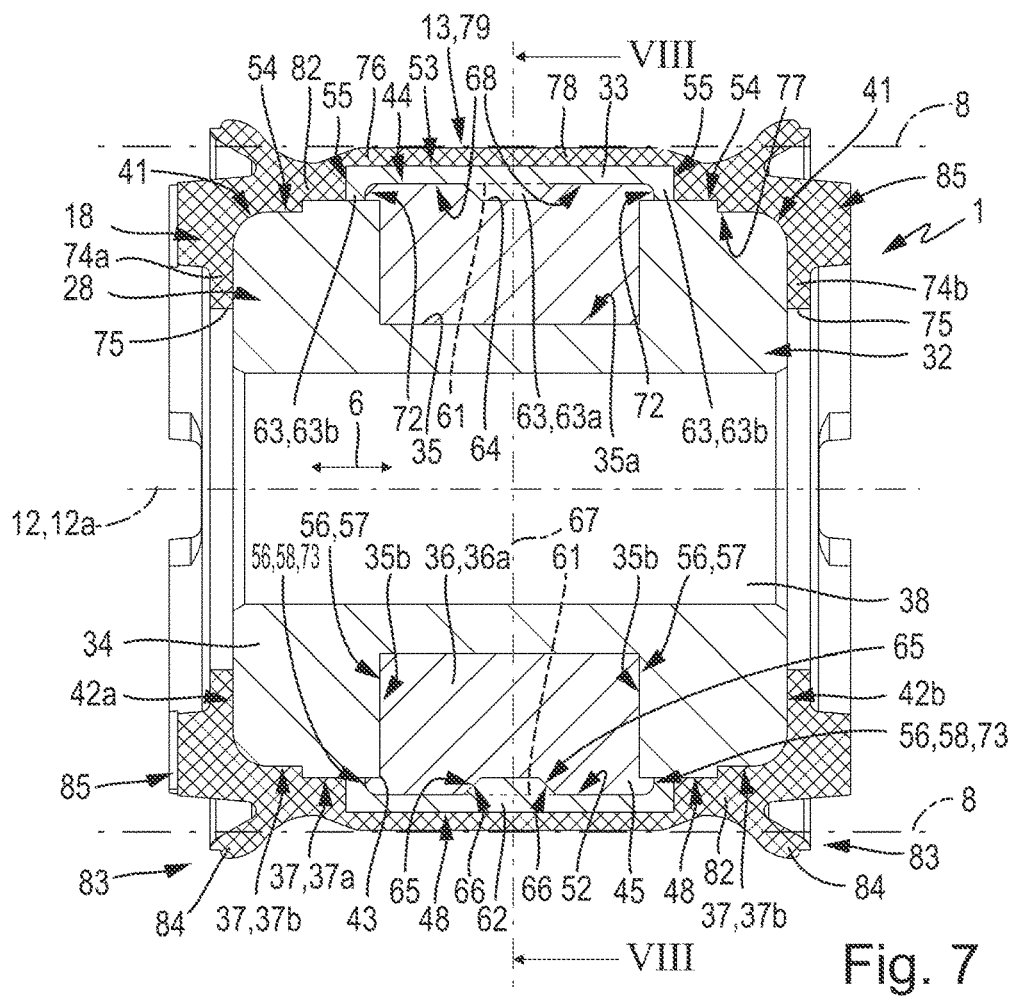

PISTON AND A FLUID-ACTUATED WORKING CYLINDER PROVIDED THEREWITH

BACKGROUND OF THE INVENTION

The invention relates to a piston for a fluid-actuated working cylinder, with a piston base unit which is coaxial to a piston longitudinal axis, consisting of a rigid core body which has radial outer peripheral surface and of an annular filling body which is seated in an annular receiving groove, said receiving groove being coaxial to the piston longitudinal axis and in the region of the radial outer peripheral surface being designed with a radially outwardly facing groove opening in the core body, with a ring element which consists of plastic, said ring element radially outwardly coaxially encompassing the piston base unit at least in the region of the filling body, being radially supported with a radial inner peripheral surface on the piston base unit, projecting radially beyond the radial outer peripheral surface of the core body and comprising an axially orientated axial support surface radially outside the piston base unit on its two axial face sides, and with an annular enveloping body which has rubber elastic characteristics, coaxially encompasses a piston subassembly consisting of the piston base unit and the ring element and comprises two enveloping body end sections which at least partially cover one of the two axial end-faces of the core body which are axially opposite one another, as well as an enveloping body intermediate section which connects the two enveloping body end sections to one another radially outside the piston subassembly and herein bridges the ring element, wherein given its primary shaping the enveloping body is integrally formed onto the piston subassembly and is axially supported with respect to the piston subassembly by the two axial support surfaces of the ring element.

The invention further relates to a fluid-actuated working cylinder, with a cylinder housing, in which a cylinder chamber which is peripherally delimited by a piston running surface is formed, in which cylinder chamber a piston which with a cylindrical piston guide surface bears on the piston running surface in a slidingly displaceable manner is received, said piston being coupled in movement to a force output element accessible outside the cylinder chamber and subdividing the cylinder chamber into two working spaces, of which at least one can be impinged by a drive fluid in a controlled manner, in order to move the piston.

Such a piston with an assigned working cylinder is known from DE 199 25 083 A1. The known piston has a piston base unit with a metallic core body and with a filling body which is arranged in an annular receiving groove of the core body and is formed by a ring magnet. The piston base unit is enclosed by ring element which covers the filling body and a part of the radial outer peripheral surface of the core body. Several longitudinal grooves which are parallel to the piston longitudinal axis and are distributed all around the piston longitudinal axis are formed in the ring element radially at the outside. Together with the piston base unit, the ring element forms a piston subassembly, onto which a rubber-elastic enveloping body is integrally formed, said enveloping body covering sections of the two axial end-faces of the core body and bridging the ring element by way of an enveloping body intermediate section which is located therebetween. The enveloping body intermediate section consists of several connection webs which are distanced to one another and which pass through the longitudinal grooves of the ring element. The sections of the ring element which extend between these longitudinal grooves form part-surfaces of a segmented piston guide surface, with which the piston on use bears on the piston running surface of the cylinder housing of a fluid-actuated working cylinder in a slidingly displaceable manner, said piston running surface peripherally delimiting a cylinder chamber. In order for the rubber-elastic enveloping body on use of the piston not to detach from the piston subassembly which carries it, a chemical bonding agent must be applied on the core body, before the enveloping body is integrally formed by injection moulding, which has a disadvantageous effect on the manufacturing costs. Furthermore, given the segmented piston guide surface, the problem of an increased proneness to wearing exists.

A working cylinder which comprises a piston which consists of two piston parts which are applied axially onto one another is known from DE 197 15 858 A1, wherein the two piston parts delimit an annular space, in which a ring magnet is received.

DE 2 163 840 describes a cylinder which is actuated by pressure means and whose piston has an annular outer piston section which is vulcanised onto an annular disc.

A piston which is known from EP 0 093 859 A2 consists of two profile discs, between which a sleeve on which a ring magnet is seated extends, wherein this subassembly is enveloped by a sealing material.

SUMMARY OF THE INVENTION

It is the object of the invention to create an inexpensively manufacturable piston which can be operated with a low wear, as well as to create a fluid-actuated working cylinder which is provided with this.

Given a piston in combination with the initially mentioned features, this object is achieved by way of the ring element and the piston base unit overlapping in the radial direction with respect to the piston longitudinal axis, in a manner such that the ring element in both axial directions of the piston longitudinal axis is supported by the piston base unit in an immovable and positive manner with respect to this, that the ring element at its radial outer side comprises a cylindrical outer radial support surface which faces radially outwards and onto which one of the two axially oriented axial support surfaces connects axially at both sides, and that the rubber-elastic enveloping body completely covers the ring element at the outer radial support surface and at the two axial support surfaces which are each designed annularly, wherein the enveloping body intermediate section forms a sleeve-like guide section which is radially supported all around the piston longitudinal axis by the outer radial support surface and which radially at the outside comprises a cylindrical piston guide surface which on use of the piston serves for piston guidance.

The object is further achieved by a fluid-actuated working cylinder of the initially mentioned type whose piston is designed in the aforementioned manner.

The piston according to the invention has an annular enveloping body which has rubber-elastic characteristics and which coaxially encompasses the piston subassembly consisting of the piston base unit and the ring element, in the radially outer lying region of said subassembly and herein completely covers the ring element. The ring element as an interface element is seated coaxially between the piston base unit and an enveloping body intermediate section which extends between the two enveloping body end sections, wherein the region of the enveloping body intermediate section which extends past the ring element forms a guide section which is structured in a sleeve-like manner and whose outer surface which is radially away from the ring element, given the utilisation of the piston within a working cylinder forms a cylindrical piston guide surface which serves for piston guidance. In contrast to the state of the art according to DE 199 25 083 A1, concerning which the piston guide surface is formed on the ring element which is only sectionally covered by the enveloping body, the piston guide surface is now located completely in a cylindrical formation on the rubber-elastic enveloping body which preferably consists of an elastomer material. The preferably rigid ring element assumes no direct guidance function, but merely serves for the targeted radial support of the guide section which is formed by the enveloping body. This guide section, although on designated use of the piston being subjected to relatively high axial forces due to the friction which arises between the piston guide surface and the piston running surface of a cylinder housing, however retains its desired piston on the piston base unit since it is axially supported by the two annular axial support surfaces of the ring element and greatly adheres to the axial support surfaces as well as to the cylindrical radial support surface of the ring element consisting of plastic, said surfaces forming a large adhesion surface. The ring element for its part is axially fixed on the piston base unit in an immovable manner irrespectively of its material nature, since a positive fit which is effective in both axial directions of the piston longitudinal axis is present between these two constituents. This positive fit results from the fact that the ring element and the piston base unit radially overlap, which in particular means that the ring element partially engages radially into the piston base unit and/or the piston base unit engages radially into the ring element. The ring element thus functions as a mechanical interface between the elastic enveloping body and the rigid piston base unit, wherein with regard to the enveloping body it acts as an adhesion partner and as a support element. As a rule, herewith an operationally reliable holding-together between the enveloping body and the remaining constituents of the piston is achieved already without the use of a chemical bonding agent, which ensures a process-reliable and inexpensive manufacture of the piston and accordingly also a fluid-actuated working cylinder which is equipped with the piston.

Advantageous further developments of the invention are to be derived from the dependent claims.

As already mentioned, it is advantageous if the rubber-elastic enveloping body is integrally formed onto the piston subassembly in a direct manner without a bonding agent, thus without the application of a chemical bonding agent, in particular by way of injection moulding an elastomer material, so that the manufactured enveloping body is an injection moulding component.

The ring element in the axis direction of the piston longitudinal axis preferably has a greater width than the groove opening of the receiving groove which is formed in the core body, wherein it is placed such that it projects beyond the groove opening at both axial sides and thus axially overlaps the sections of the core body which axial flank the groove opening at both sides.

With regard to the filling body, it is expediently a ring magnet which serves for position detection on using the piston. If the piston is provided for applications without position detection, then a functionless filling body which one could also be denoted as a dummy body could be used instead of a ring magnet. In all cases, the filling body preferably consists of plastic material, wherein a ring magnet which consists of plastic expediently comprises permanent-magnetic particles which are embedded into the plastic material.

The filling body with regard to its primary shaping is preferably produced directly in the receiving groove by way of injection moulding, so that it represents an injection moulded components. Such a manufacture is extremely inexpensive and has the advantage of an extremely accurately fitting positive fixation of the filling body in the receiving groove. Alternatively, the filling body can be for example a premanufactured segment ring body whose ring segments are inserted from radially outwards into the receiving groove, or the core body in a plane which is at right angles to the piston longitudinal axis can be subdivided into two core body halves in the region of the receiving groove, said core body halves on manufacture of the piston being applied coaxially onto one another after a premanufactured annular filling body has been inserted into the one groove half.

The plastic of the ring element can be a fibre-reinforced material. The same also applies to the filling body. A non-reinforced plastic however can also be used as an alternative.

Although the rigid core body in principle can also consist of a plastic or polymer, on account of the high stability which is entailed by this it is advantageous if it consists of metal, wherein an aluminium material is recommended on account of the low weight and the non-magnetisable characteristics.

The ring element which consists of plastic is expediently an injection moulded component which given its primary shaping has been integrally formed or injected directly onto the piston base unit. It is above all with large-scale manufacture that this permits an extremely inexpensive manufacture which is more favourable than the basically likewise possible use of a premanufactured ring element which is slotted at a location of its circumference, in order to permit a snapping onto the piston base unit.

The radial overlapping of the ring element and the piston base unit which is responsible for the axially positive support between these two constituents is effected on the part of the piston base unit preferably exclusively at the filling body, so that the core body does not participate in this axially positive-fit radial overlapping. By way of this, a simply manufacturable geometry can be realised for the core body. Basically however, it would indeed be conceivable to provide radial overlapping measure on the piston base unit which entails an axial positive fit, additionally or exclusively on the core body.

In order to provide the radial overlapping between the ring element and the piston base unit, said overlapping being responsible for the axially positive support, it is favourable if the ring element in the region of its radial inner peripheral surface comprises at least one radially inwardly projecting support projection which extends around the piston longitudinal axis and which in both axial directions of the piston longitudinal axis develops a support effect and is therefore denoted as a dual-acting support projection. This dual-acting support projection engages radially into a complementary annular-groove-shaped support deepening which is formed in the piston base unit in the region of the radial outer peripheral surface of the piston base unit, so that its experiences an axial positive support with respect to the piston base unit in simultaneously both axial directions of the piston longitudinal axis. The dual-acting support projection as the assigned annular-groove-shaped support deepening is preferably designed annularly in a closed manner, so that a large-surfaced support which is based on an annular surface is present in combination with a low specific material loading.

At least one annular-groove-shaped support recess which interacts with a dual-acting support projection is expediently formed directly in the filling body of the piston base unit, wherein—as also the support projection—it is narrower than the groove opening of the receiving groove.

The ring element is preferably designed such that at the radial outside it comprises a sleeve-like support section, on which the outer radial support surface and the two axial support surfaces are formed and on whose inner periphery the at least one dual-acting support projection is formed. The at least one dual-acting support projection has smaller dimensions in the axis direction of the piston longitudinal axis than the sleeve-like support section.

In the context of the aforementioned shaping, a preferred construction shape envisages the ring element having only one single dual-acting support projection which in particular is placed centrally between the two axial support surfaces. Concerning this single dual-acting support projection, this in particular is the single support projection which coming from the sleeve-like support section projects radially inwards, so that the annular body of the ring element has a T-shaped cross section at every location of its periphery.

Basically, the annular body on the inner periphery of the sleeve-like support section can also comprise several dual-acting support projections which are axially distanced to one another and each immerse into an individual annular-groove-shaped support deepening of the piston base unit.

Concerning a likewise advantageous further development of the piston, the ring element in the region of its radial inner peripheral surface is provided with two single-acting support projections which are distanced to one another in the axis direction of the piston longitudinal axis and each extend about the piston longitudinal axis, the description thereof as "single-acting" being based on the fact that they develop a supporting function with respect to the piston base unit in each case in only a single axial direction. The support direction of the two single-acting support projections is opposite to one another. A radially inwardly open support space of the ring element is located between the two single-acting support projections, into which support space an annular outer section of the filling body which projects beyond the radial outer peripheral surface of the core body immerses. By way of this, the outer axial end-face sections of the two end-faces of the filling body, said end faces being opposite to one another and said end-face sections being located on this outer section, are each axially flanked by one of the two single-acting support projections, wherein each support projection is axially supported on the end-face which is assigned to it.

The two single-acting support projections are expediently each designed in an annularly closed manner, so that they effect a large-surfaced support over a ring surface with only a low specific loading.

Concerning a possible design, the ring element for the axially positive support with respect to the piston base unit comprises exclusively the two aforementioned single-acting support projections, so that the annular body of the ring element along its entire periphery has a U-shaped cross section with a radially facing U-opening. A design which is alternative in respect to this envisages a dual-acting support section being present between the two single-acting support projections, so that the annular body of the ring element has an E-shaped cross section at every location of its periphery. In this case, an annular outer section of the filling body is flanked axially on both sides by one of the single-acting support projections, whereas the dual-acting support projection immerses into an annular-groove-shaped support deepening of the filling body.

The two enveloping body end sections are expediently each designed in an annulus-shaped manner and each cover an annular section of one of the two axial end-faces of the piston core. The piston core expediently has an axial opening which is envisaged to fasten a piston rod.

Each enveloping body end section is expediently provided with a buffer structure which given the use of the piston in a working cylinder ensures an impact damping in the piston end position. The buffer structure expediently consists of several circular-segment-shaped axial projections.

The rubber-elastic enveloping body expediently not only defines the piston guide surface but given the use in a working cylinder also functions as sealing means for the sealing interaction with a piston running surface of cylinder housing. The rubber-elastic enveloping body expediently has two annular sealing sections which are coaxial to the piston longitudinal axis and between which the guide section extends and which expediently each form a radially deformable sealing lip. Each sealing section is expediently located in the transition region between the enveloping body intermediate section and one of the two enveloping body end sections.

A fluid-actuated working cylinder which is provided with the piston according to the invention has a force output element which with regard to drive is connected to the piston and which is accessible outside the cylinder housing of the working cylinder for a force output. With regard to the force output element, it is particularly a piston rod which is fastened to the piston. The piston however can also be used in the context of piston-rod-free working cylinders.

BRIEF DESCRIPTION OF THE DRAWINGS

The invention is hereinafter explained in more detail by way of the accompanying drawing. In these are shown.

DETAILED DESCRIPTION

On the one hand in FIGS. 1 to 4 and on the other hand FIGS. 5 to 8, two advantageous embodiment examples of a piston 1 according to the invention are illustrated, these hereinafter being described together, wherein the statements relate to all embodiment examples inasmuch as no deviating details are made in the individual case.

Figure 1:
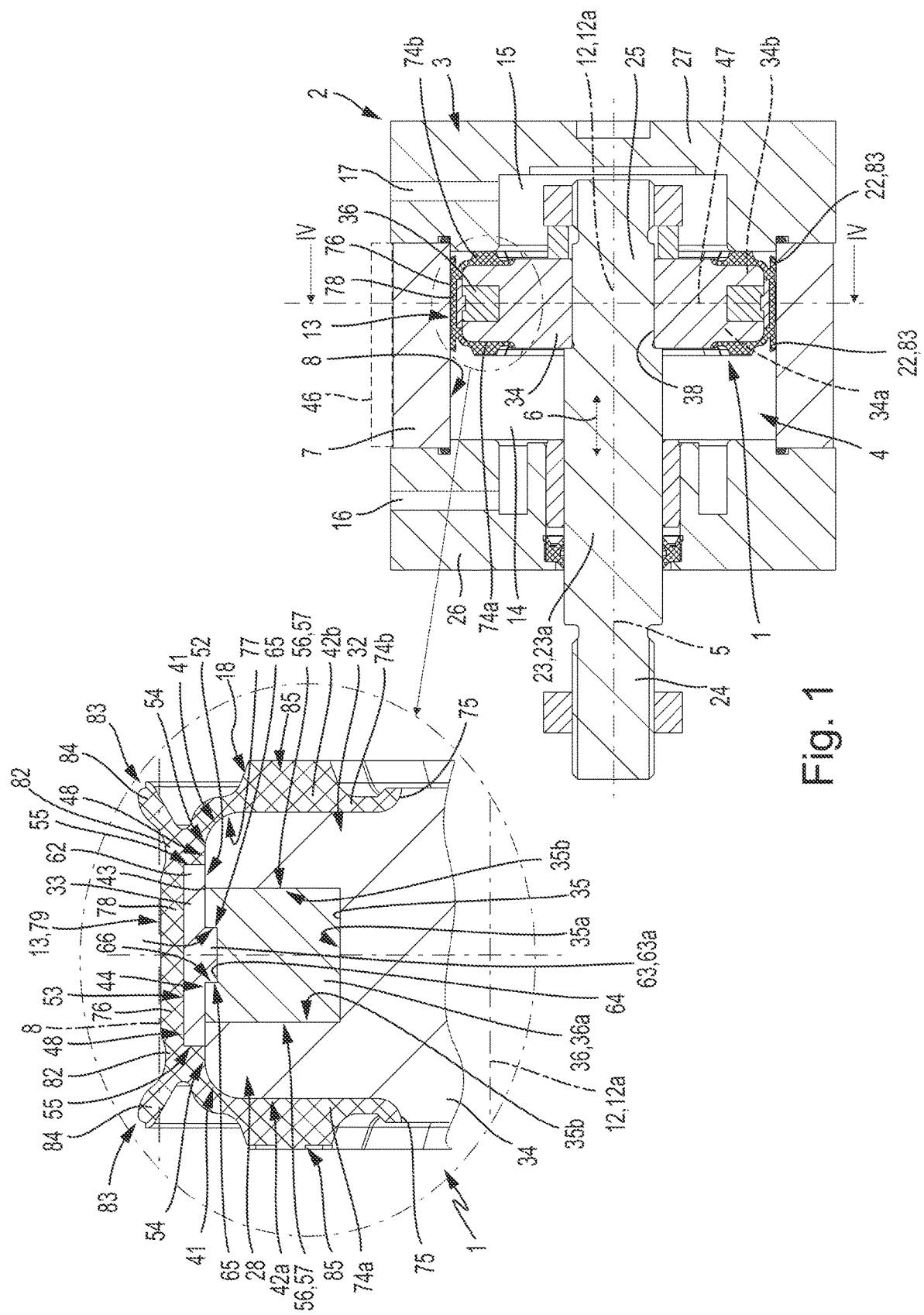
FIG. 1 a preferred construction form of a fluid-actuated working cylinder according to the invention in a longitudinal section, which is provided with piston according to the invention of a preferred construction which is likewise shown in a longitudinal section and whose longitudinal section runs along the section line I-I of FIGS. 2 and 4, wherein a region of the piston which is framed by dot-dashing is also illustrated separately once again in an enlarged manner, FIG. 2 an isometric individual representation of the piston which is evident from FIG. 1, FIG. 3 an isometric longitudinal section of the piston of FIGS. 1 and 2 according to section plane I-I of FIGS. 2 and 4, FIG. 4 a middle section through the piston of the FIGS. 1 to 3 according to the section plane IV-IV of FIG. 1 which runs at right angles to the piston longitudinal axis, FIG. 5 an isometric individual representation of a preferred further embodiment example of the piston according to the invention which in the same manner as the piston of FIGS. 1 to 4 can be contained in a working cylinder according to FIG. 1, FIG. 6 an isometric longitudinal section of the piston of FIG. 5 according to section plane VI-VI of FIGS. 5 and 8, FIG. 7 a further longitudinal section of the piston which is illustrated isometrically in FIG. 5, in a section plane analogous to the representation in FIG. 6, and FIG. 8 a section of the piston of FIGS. 5 to 7 according to section plane VIII-VIII of FIG. 7 which runs at right angles to the piston longitudinal axis.

FIG. 1 shows a fluid-actuated working cylinder 2, which in particular is a pneumatic cylinder which is operated with pressurised air. The working cylinder 2 has a cylinder housing 3 which encompasses a cylinder chamber 4, in which the piston 1 according to the invention is arranged.

The working cylinder 2 has a cylinder longitudinal axis 5, wherein the piston 1 is movable to and fro relative to the cylinder housing 3 whilst executing a linear working movement 6 in the axis direction of the cylinder axis 5, said working movement being indicated by a double arrow.

The cylinder housing 3 has a cylinder pipe 7 which extends in the axis direction of the cylinder longitudinal axis 5, peripherally encompasses the cylinder chamber 4 radially to the outside and has a cylindrical inner peripheral surface which forms a piston running surface 8. The piston 1 which has a piston longitudinal axis 12 which is also indicated in a dot-dashed manner in the other drawings, is arranged coaxially in the cylinder chamber 4, wherein with a cylindrical piston guide surface 13 which is formed in the region of its radial outer periphery and is coaxial to the piston longitudinal axis 12 it bears on the piston running surface 8 in a slidingly displaceable manner.

The piston 1 axially subdivides the cylinder chamber 4 into two workings spaces 14, 15 into which an individual fluid channel 16, 17 which passes through the cylinder housing 3 runs, through which fluid channel a controlled fluid subjection of the respectively assigned working space 14, 15 with a drive fluid which is formed for example by pressurised air is possible. In this manner, the piston can be driven into the working movement 6.

A rubber-elastic enveloping body of the piston 1 which comprises a piston guide surface 13 is provided with integral sealing means 22 which in particular are present additionally to the piston guide surface 13 and additionally to the piston guide surface 13 bear on the piston running surface 8 in a slidingly displaceable and simultaneously sealing manner. By way of this, the two working spaces 14, 15 are separated from one another in a fluid-tight manner.

A force output element 23 which is accessible outside the cylinder housing 3 is coupled in movement to the piston 1 and synchronously participates in the working movement 6. This movement can therefore be taken up at a force output section 24 of the force output element 23 which is located outside the cylinder housing 3, in order to move and/or position an arbitrary object, for example a machine element. The force output element 23 with regard to the illustrated preferred embodiment example is a piston rod 23a which is coaxial to the longitudinal axis 5 and which with an inner end section 25 which is located in the cylinder chamber 5 is fastened to the piston 1. The piston rod 23a passes through in a slidingly displaceable manner and seals off a first cylinder cover 26 of the cylinder housing 3 and with its outer end section which lies outside the cylinder housing 3 forms the force output section 24.

Given the working movement 6, the piston 1 can move between two axial travel end positions which are defined in that it either bears on the first cylinder cover 26 or on a second cylinder cover 27 of the cylinder housing 3, said second cylinder cover lying axially opposite to the first at a distance. What is shown is a retracted travel end position with a piston 1 bearing on the second cylinder cover 27.

Figure 2:
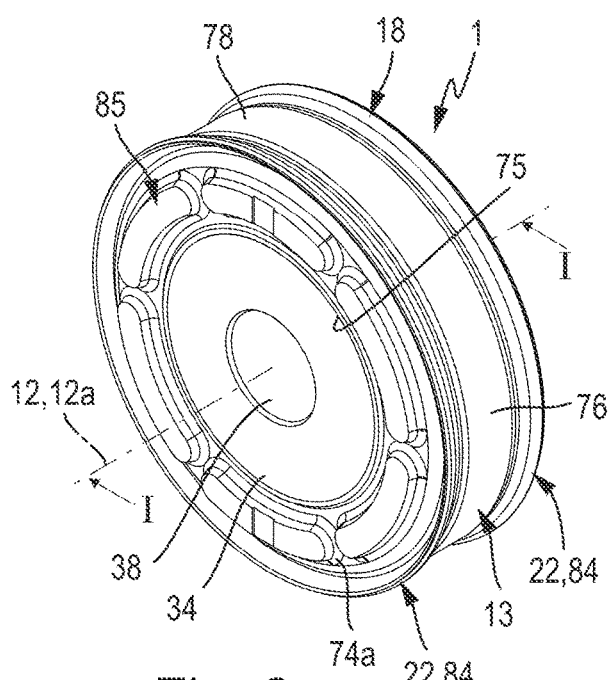
Figure 3:
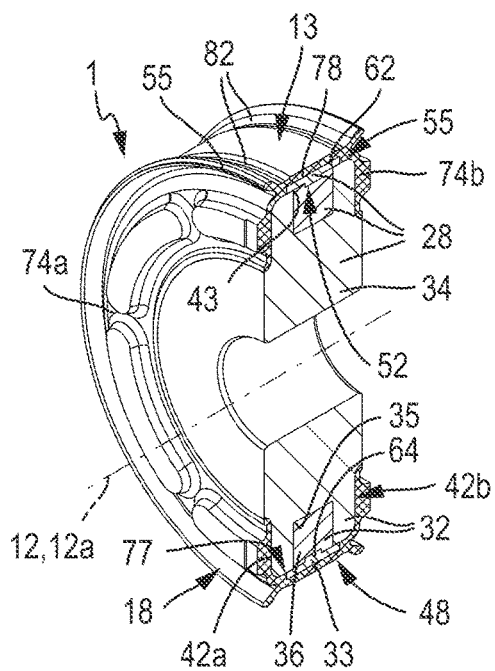
Figure 4:
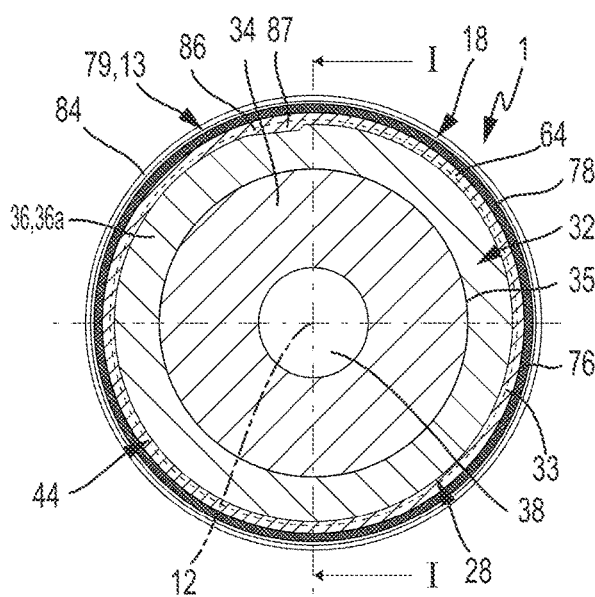
Figure 8:
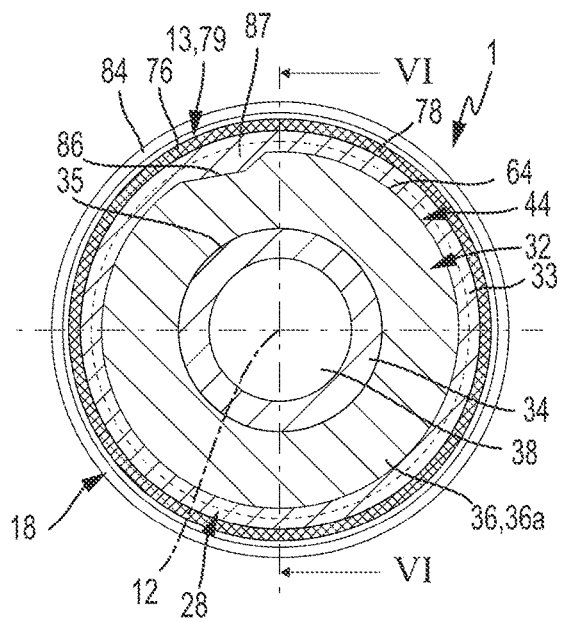

The piston of the working cylinder 2 which is illustrated in FIG. 1 corresponds to the construction shape which is supplementarily illustrated in FIGS. 2 to 4. Concerning an alternative embodiment, the piston 1 is designed according to the drawings in FIGS. 5 to 8, wherein the remaining constituents of the working cylinder 2 can be identical disregarding the a preferably longer cylinder pipe 7. The longer cylinder tube 7 is due to the fact that the piston 1 which is illustrated in FIGS. 5 to 8 has a larger construction length than that of FIGS. 1 to 4.

The piston 1 has a multi-part construction, so that one can consider it as a subassembly of several components which are assembled and fixedly held together, said subassembly being able to be handled as a unit. One of these several components is the already mentioned enveloping body 18. It is fastened to a multi-part piston subassembly 28 of the piston 1 which it coaxially encompasses in the radially outer lying region. The piston subassembly 28 consists of a multipart piston base unit 32 and of a single-piece ring element 33 which is fixed thereto and which consists of plastic. The ring element 33 is arranged in a manner in which it radially outwardly coaxially encompasses the piston base unit 32.

The piston base unit 32 consists of a rigid core body 34 and of an annular filling body 36 which is fixed in an annular receiving groove of the core body 34.

The aforementioned components of the subassembly which forms the piston 1, specifically the enveloping body 18, the ring element 33, the core body 34 and the filling body 36 are arranged coaxially to one another and with respect to the piston longitudinally axis 12.

The core body 34 has a rigid structure. It has a cylindrical and in particular circularly cylindrical radial outer peripheral surface 37 which according to the construction shape of FIGS. 1 to 4 can have the same diameter throughout or however can be stepped in the axis direction of the piston longitudinal axis 12 which is hereinafter denoted as the longitudinal direction 12a, which is the case with the construction forms of the FIGS. 5 to 8. The latter results in the radial outer peripheral surface 37 having axially successive longitudinal sections of a different diameter. By way of example, the piston of FIGS. 5 to 8 has a middle peripheral section 37a of the radial outer peripheral surface 37 whose diameter is larger than that of two outer peripheral sections 37b of the radial outer peripheral surface 37 which connect axially at this side and at the other side.

Given its designated use, the piston 1 is fixed on the force output element 23 via the core body 34. By way of example, in its centre it has an axial opening 38 which is provided for receiving the inner end section 25 of the piston rod 23a. For fixation, according to FIG. 1 the piston rod 23a at its inner end section 25 can be inserted through the axial opening 38 and be fixed to the piston rod 23a by way of a fastening screw 42 which is applied onto the inner end section 25. Concerning an embodiment example which is not illustrated, the axial opening 38 has an inner thread, into which the piston rod 23a is screwed to an outer thread of its inner end section 24. A welding fastening is likewise possible.

The core body 34 has two first and second axial end-faces 42a, 42b which are axially opposite one another and which in the case of the presence of the axial opening 38 are designed annularly and each merge into the cylindrical radial outer peripheral surface 37 via a rounded transition region 41.

By way of example, the core body 34 consists of metal and in particular of aluminium or stainless steel. This entails a very high strength. An aluminium material gives the piston 1 a particularly low weight.

The already mentioned annular receiving groove 35 is incorporated in the core body 34 at the radial outer peripheral surface 37 in an arrangement which is coaxial to the piston longitudinal axis 12. The receiving groove 35 has a groove opening 42 which faces radially outwards with respect to the piston longitudinal axis 12 and extends all around the piston longitudinal axis 12.

The receiving groove 35 has a groove base surface 35a which lies radially inwardly opposite the groove opening 43 and is preferably designed cylindrically, as well as two annular groove side surfaces 35b which lie opposite one another in the piston longitudinal direction 12a and face one another. Concerning the embodiment example of the FIGS. 5 to 8 the groove opening 43 lies in the region of the central peripheral section 37a.

Although not being necessary, it is however advantageous if the receiving groove 35 is located in the core body 34 in the longitudinal middle, thus its distance to the two axial end-faces 42a, 42b is equally large, which is realised with the two embodiment examples.

Furthermore, it is expedient if the receiving groove 35 has a rectangular cross section which is the case with the illustrated embodiment examples.

The already mentioned annular filling body 36 is seated in the receiving groove 35. This filling body 36 expediently bears on the groove base surface 35a as well as on the two groove side surfaces 35b. It is further advantageous if it fills out the complete groove cross section of the receiving groove 35 which is the case with the illustrated embodiment examples.

According to embodiment examples which are not illustrated, the cross-sectional height of the filling body 36 can be smaller than that of the receiving groove 35, so that an outer region of the receiving groove 35 which connects onto the groove opening 43 is not filled out by the filling body 36.

The filling body 36 radially at the outside preferably has a cylindrical radial outer peripheral surface 44 which can run in a flush manner with the connecting surface sections of the radial outer peripheral surface 37 of the core body 34—which is the case with the embodiment example of FIGS. 1 to 4—or however projects radially outwards with respect to the axially adjacent sections of the radial outer peripheral surface 37 of the filling body 36, as is the case with the embodiment example of FIGS. 5 to 8. The latter is manifested in the filling body 36 projecting with an annular outer section 45 beyond the radial outer peripheral surface 37 of the core body 34 all around.

Concerning both illustrated embodiment examples, the filling body 36 is a ring magnet 36a which has permanent-magnetic characteristics. Given designated use of the piston 1, it can be used in order to detect at least one operating position which is assumed by the piston 1 given its working movement 6 relative to the cylinder housing 3. In this context, the working cylinder 2 on its cylinder housing 3 is provided with position detection device 46 which is merely indicated in a dot-dashed manner in FIG. 1, can be actuated in a touch-free manner by the permanent-magnetic ring magnet 36a and on actuation emits an electrical position signal which can be processed by an electronic control device. The position detection device 46 for example comprises one or more position sensors which are preferably designed as sensors which respond to a magnetic field, for example Hall sensors.

Concerning both illustrated embodiment examples, the ring magnet 36a consists of plastic, wherein it is particularly a plastic matrix which permanent-magnetic particles which are embedded therein. This plastic on manufacture of the piston 1 is brought into the receiving groove 35 in the flowable state and subsequently solidifies. In particular, this is effected by way of injection moulding, so that the ring magnet 36a is an injection moulded component which on its initial shaping is produced directly in the receiving groove 35.

In cases in which no position detection is desired, instead of a ring magnet 36a a less expensive filling body 36 without permanent-magnetic characteristics, for example a simple plastic body of polyamide can be seated in the receiving groove 35. It functions as a dummy for the ring magnet 36 and fills out the receiving groove 35 instead of this.

Preferably, the filling body 36 is designed as one piece corresponding to the two embodiment examples. Despite this, the injection moulding manufacture permits a simple incorporation unto the receiving groove 35 which is closed all around except for at its groove opening 43. Despite this, the annular filling body 36 could also be a single-piece annular component which is manufactured separately outside the core body 35, for example if the core body 34 consists of two separate core body halves 34a, 34b which are applied axially onto one another in a joining region 47 which passes through the receiving groove 35, as is indicated in FIG. 1 in a dashed manner. Furthermore, a filling body 36 which is manufactured outside the receiving groove 35 can be segmented in its peripheral direction, wherein the filling body segments which result from this are inserted from the radial outside through the groove opening 43 into the receiving groove 35.

The piston base unit 32 which is composed of the core body 34 and the filling body 36, at the radial outside has an outer peripheral surface 48 which is away from the piston longitudinal axis 12, is denoted as a base unit outer peripheral surface 48 for a better understanding and is composed of the radial outer peripheral surface 44 of the filling body 36 and the surface sections of the radial outer peripheral surface 37 of the core body 34 which are not covered by the filling body 36.

The annular outer section 45 of the filling body 36 according to the illustration of FIG. 7 can be wider than the groove opening 43, so that it covers narrow cylindrical surface sections of the radial outer peripheral surface 37 of the core body 34 which axially connect onto the groove opening 43 at both sides. In this case, not the entire complete radial outer peripherals surface 37 of the core body 34 contributes to the formation of the base unit outer peripheral surface 48.

The piston base unit 34 is radially outwardly coaxially encompassed by the ring element 33 at least in the region of the filling body 36. The ring element 33 has a radial inner peripheral surface 52 which faces the piston longitudinal axis 12 and with which it bears on the base unit outer peripheral surface 48 and in this manner is radially supported on the piston base unit 32. The ring element 33 consists of plastic, wherein a thermoplastic plastic material is preferred. It can be a fibre-reinforced plastic, so that damage such as a tear formation is to be ruled out even in the case of extremely high loading.

The width of the ring element 33 which is measured in the piston longitudinal direction 12a is smaller than the width of the base unit outer peripheral surface 48 which is measured in the same direction. Hence an outer edge section 54 of the base unit outer peripheral surface 48 which is not covered by the ring element 33 connects axially at both sides onto the radial outer peripheral surface 53 of the ring element 33 which is away from the piston longitudinal axis 12 and which on account of its function which is yet to be explained is also denoted as an outer radial support surface 53.

The ring element 33 encompasses the filling body 36 all around the piston longitudinal axis 12 in particular in an uninterrupted manner. Its width which is measured in the piston longitudinal direction 12a can be smaller than that of the filling body 36, so that the outer edge sections 54 of the base unit outer peripheral surface 48 which is not covered by the ring element 33 is composed of surface sections of the radial outer peripheral surfaces 37, 44 of the core body 34 and of the filling body 36.

Expediently, the ring element 33 however has a width which corresponds at least to the width of the filling body 36, so that it completely covers its radial outer peripheral surface 37. Preferably and according to the illustrated embodiment examples, the ring element 33 is even wider than the filling body 36, so that it projects beyond the enveloping body 36 on both sides with respect to the piston longitudinal direction 12a. In all cases, the ring element 33 radially projects radially beyond the base element outer peripheral surface 48 and herein in particular the radial outer peripheral surface 37 of the core body 34.

The ring element 33 on its two axial face sides which are opposite one another and face in the position longitudinal direction 12a each has an annular axial end-face 55 which on account of its function which is yet to be explained is also denoted as an axial support surface 55 and which coming from the base unit outer peripheral surface 48 extends outwards in the radial direction with respect to the piston longitudinal axis 12. Each axial support surface 55 expediently lies in a plane which is at right angles to the piston longitudinal axis 12. Each axial support surface 55 merges radially outwards into the outer radial support surface 53 which is preferably designed cylindrically.

The ring element 33 is a component which is separate with respect to the piston base unit 32 and which expediently on manufacture is applied directly on the piston bay unit 32 by way of primary shaping. This relates to the illustrated embodiment examples. Here, the ring element 33 is integrally formed or injected onto the base unit outer peripheral surface 48 by way of injection moulding, so that it represents an injection moulded component. Together, the core body 34, the filling body 36 and the ring element 33 form the already mentioned piston subassembly 28 of the piston 1. A particularity of the piston subassembly 28 lies in the fact that the ring element 33 is supported by the piston base unit 32 with a positive fit which is effective in both directions of the piston longitudinal axis 12, so that independently of a possibly also present material or friction connection a positive connection is present which prevents relative movements between the ring element 33 and the piston base element 32 in the piston longitudinal direction 12a. This axial positive fit results from the ring element 33 and the piston base unit 32 overlapping in the direction which is radial with respect to the piston longitudinal axis 12 and herein supporting one another without play in the piston longitudinal direction 12a.

The radial overlapping which is responsible for the axial positive fit, on the part of the piston base unto can indeed be at least partly realised by the core body 34. More advantageous and with all illustrated embodiment examples however, a design concerning which the radial overlapping on the part of the piston base unit 32 entailed by an axial supporting is limited to the filling body 36 is more advantageous. The filling body 36 for its part is supported on the core body 34 with a positive fit in the piston longitudinal direction 12a and therefore accordingly in an immovable manner by way of it bearing with the surface sections 57 of its two axial end-faces 56 which lie within the receiving groove 35, said end-faces being axially opposite one another, on the respective facing opposite groove side surface 35b. The aforementioned surface sections 57 of the axial end-faces 56 which lie within the receiving groove 35 are hereinafter also denoted as inner axial end-face surface sections 57 for a better differentiation.

Concerning the embodiment example of FIGS. 1 to 4, the ring element 33 has a sleeve-like support section 62, on which the outer radial support surface 53 and the two axial support surfaces 55 are formed. This sleeve-like support section 62 bears with the radial inner peripheral surface 52 on the radial outer peripheral surface 44 of the filling body 36 as well as on a surface section of the radial outer peripheral surface 37 of the core body 34 which connects thereto.

In the region of the radial inner peripheral surface 52, the sleeve-like support section 62 comprises a radially inwardly projecting support projection 63 concerning which it is a dual-acting support projection 63a which develops a double-sided supporting effect and which engages radially into a complementary annular-groove-shaped support deepening 64 which is formed in the filling body 36 in the region of its radial outer peripheral surface 44. The dual-acting support projection 63a although in principle being able to be segmented in its circumferential direction, thus all around the piston longitudinal axis 12, it is however expediently annularly closed.

The dual-acting support projection 63a has two annular end-faces which are axially orientated, are opposite one another and each form a support surface 65, wherein each support surface 65 bears on a counter support surface 66 which faces it and which is formed by one of the two groove flanks of the annular groove shaped support deepening 64. Hence the ring element 33 via its dual-acting support projection 63a is immovably supported in the support deepening 64 which is narrower with respect to the groove opening 43, in both axial directions of the piston longitudinal axis 12. The term "dual-acting" is selected since the respective support projection 63, 63a is effected in a dual manner, specifically in both axial directions of the piston longitudinal axis 12.

Although the ring element 33 could comprise several such dual-acting support projections 63a, it is advantageous if it has only a single such dual-acting support projection 63a, beyond which the sleeve-like support section 62a projects at both sides. This single dual-acting support projection 63a is preferably placed centrally between the two face-side axial support surfaces 55, so that the annular body of the ring element 33 has a T-shaped cross section.

Concerning the embodiment example of FIGS. 5 to 8, the ring element 33 likewise comprises a sleeve-like support section 62 with an axially central dual-acting support projection 63 on the radial inner peripheral surface 52. This dual-acting support projection 63a, analogously to the embodiment example of FIGS. 1 to 4 projects into a complementary annular-groove-shaped support deepening 64 which is formed in the radial outer peripheral surface 37 of the filling body 36. The support surfaces 65 and counter support surfaces 66 which herein bear on one another and serve for a dual-acting support can each extend in a plane which is radial to the piston longitudinal axis 12 according to the embodiment example of FIGS. 1 to 4, but however are preferably inclined with respect to a reference plane 67 which is at right angles to the piston longitudinal axis 12, so that the dual-acting support projection 63*a* tapers radially inwards and likewise the assigned support deepening 64.

Additionally, with the embodiment example of FIGS. 5 to 8, the ring element 33 in the region of its radial inner peripheral surface 52 yet has two further support projections 63 which each extend around the piston longitudinal axis 12 and each exert a positive support with respect to the core body 34 in only one axial direction of the piston longitudinal axis 12 and are therefore denoted as single-acting support projections 63*b*.

The two single-acting support projections 63*b* are distanced to one another in the axis direction of the piston longitudinal axis 12 and together laterally delimit a radially inwardly open support space 68, into which the filling body 36 projects with its annular outer section 45.

The support space 68 is subdivided into two annular part-spaces by way of the middle dual-acting support projection 63*a*. However, the dual-acting support projection 63 can also be done away with, so that the support space 68 has no subdivision. An inner contour of the ring element 33 which results from this is indicated in FIG. 7 at 61 in a dashed manner.

Each single-acting support projection 63*b* on the inner side which faces the support space 68 has an annular inner support surface 72 which bears axially on an opposite annular outer counter support surface 73 which is formed by an outer axial end-face section 59 of the assigned axial end-face 56 of the filling body 36, said outer axial end-face section being formed on the annular outer section 45.

The annular outer section 45 is therefore embraced in a clip like manner by the ring element 33 which comprises the two single-acting support projections 63*b*. Depending on whether the ring element 33 additionally comprises the middle dual-acting support projection 63*a* or not, the annular body of the ring element 33 has an E-shaped or a U-shaped cross section.

Concerning the embodiment example of FIGS. 5 to 8, the two axial support surfaces 55 are each formed by an end-face of the sleeve-like support section 62 and of the axial outer surface of the connecting, single-acting support projection 63*b* which is opposite to the annular inner support surface 72.

The two single-acting support projection 63*b* although being able to be segmented in their circumferential direction, however are preferably each designed in an annularly closed manner.

With regard to an embodiment example which is not illustrated, the ring element 33 has a ring body with a rectangular cross section whose radially inner lying part-region forms a dual-acting support projecting 63*a*, whereas the part-region which connects thereto at the radial outside forms the outer radial support surface 53 and the two axial support surfaces 55.

With regard to all embodiment examples, the ring element 33 can be designed relatively thinly in the radial direction. In order, despite this, for it to be able to be applied in a very simple manner by way of injection moulding, it is advantageous if the annular support deepening 64 on its base surface locally has a radially deepened region 86 which can be used as an injection point for feeding the liquid plastic.

The finished injected ring element 33 there on its dual-acting support projection 63 has a local radial thickening 87.

Concerning an embodiment which is not illustrated, the radial overlapping, entailed by an axial supporting, between the ring element 33 which functions as an interface element and the piston base unit 32, on the part of the piston base unit 32 relates exclusively to the core body 34. Herein, the ring element 33 preferably has a single dual-acting support projection 64 which engages radially into an annular-groove-shaped support deepening 64 of the core body 34, wherein the annular-groove-shaped support deepening 64 is formed directly by the annular receiving groove 35. The annular receiving groove 35 in its outer section which connects onto the groove opening 43 is not filled out by the filling body, wherein the ring element 33 immerses with a dual-acting support projection 63*a* which has the same width as the receiving groove 35, into the section of the receiving groove 35 which is not filled out.

The annular enveloping body 18 which is mentioned above, has rubber-elastic characteristics and preferably consists of an elastomer material encompasses the aforementioned piston subassembly 28 in a coaxial arrangement in the region of its radial outer periphery. It has two enveloping body end sections 74*a*, 74*b* which are each arranged in front of one of the two axial end-faces 42*a*, 42*b* of the core body 34 and in particular partially cover the core body 34. Each enveloping body end section 74*a*, 74*b* bears on the assigned axial end-face 42*a*, 42*b* of the core body 34.

Preferably, the two enveloping body end sections 74*a*, 74*b* are each designed in an annulus-shaped manner and frame a central opening 75 in which region the core body 34 is not covered. Each central opening 75 is coaxially flush with the optionally present axial opening 38 of the core body 34.

The enveloping body 18 further has an enveloping body intermediate section 76 which coaxially encompasses the piston subassembly 28 in a hollow-cylinder-like manner and integrally connects the two enveloping body end sections 74*a*, 74*b* to one another. Herein, the enveloping body intermediate section 76 bridges the ring element 33 and the sections of the radial outer peripheral surface 37 of the core body 34 which axial connect thereto at both sides, at their radial outer side The enveloping body 18 has a single-piece construction and is expediently integrally formed onto the piston subassembly directly with its primary shaping. This integral formation in particular is effected by way of injection moulding, so that the rubber-elastic enveloping body 18 represents an injection moulding component.

On account of its integral formation onto the piston subassembly 28, the shaping of the inner peripheral surface 77 of the enveloping body 17 which faces the piston longitudinal axis 12 corresponds to the negative shape of the outer contour of the piston componentry 28 which is covered by the enveloping body 18. One can also speak of a complementary shaping. Herewith, the enveloping body 18 not only bears on the two axial end-faces 42 of the core body 34, but also on the outer radial support surface 53 and on the two axial support surfaces 55 of the ring element 33 as well as on the surface sections of the radial outer peripheral surface 37 of the core body 34 which are not covered by the ring element 33, and on the transition regions 41.

The ring element 33 is herein completely covered by the enveloping body intermediate section at the two axial support surfaces 55 as well as on the outer radial support surface 53. In this manner, the section of the enveloping body intermediate section 76 which bears on the outer radial support surface 53 of the ring element 33 forms a guide section 78 of the piston 1 which is structured in a sleeve-like manner and whose outer peripheral surface 79 which is radially away from the ring element 33 forms the cylindrical piston guide surface 13 which is already mentioned further above.

The enveloping body 18 by way of example consists of a plastic material which is capable of being injection moulded and which after its curing has rubber-elastic characteristics. Preferably, the enveloping body 18 consists of a thermoplastic elastomer material.

On injecting the enveloping body 18 onto the piston subassembly 28, the material of the enveloping body 18 assumes an intimate bonding connection with the plastic material of the peripherally injected ring element 33. The adhesion surface which as a whole is composed of the outer radial support surface 53 and the two axial support surfaces 55 is relatively large, so that the enveloping body 18 is held very well at its enveloping body intermediate section 76 by way of a material fit. Additionally, the enveloping body 18 undergoes an axial support by the ring element 33 at the axial outer sections 82 of the enveloping body intermediate section 76 which connect axially onto the guide section 78, in the regions which lie axially opposite the axial support surfaces 55. By way of this, one effectively prevents the enveloping body 18 from axially displacing on the piston subassembly 28 when it slides with the enveloping body intermediate section 76 on the piston running surface 8 which is illustrated in FIG. 7 and in an enlarged detail in FIG. 1 in a dot-dashed manner. This is the case despite the enveloping body 18 having been injected onto the piston subassembly 28 without a prior application of a bonding agent and therefore experiences no relevant adhesion in the contact region to the core body 34.

The initially mentioned sealing means 22 of the enveloping body 18 expediently consist of two annular sealing sections 83 which are coaxial to the piston longitudinal axis 12 and between which the guide section extends 78 and which are expediently formed on the axial outer sections 82 of the enveloping body intermediate section 76. These sealing sections 83 which expediently comprise a sealing lip 84 which projects radially outwards in an oblique manner and is radially deformable with respect to the piston longitudinal axis 12 project beyond the piston guide surface 13 in the state in which it is not assembled in a cylinder housing 3, in the manner which is evident from the enlarged detail of FIG. 1 and form the remaining drawings. On inserting the piston 1 into the cylinder chamber 4, the sealing sections 83 are bent radially inwards in the manner which is indicated in FIG. 1, so that they bear on the piston running surface 8 with a radial biasing and ensure a reliable sealing.

The two enveloping body end sections 74 at their outer side which is axially away from the core body 34 each comprise an elastically complaint buffer structure 85, with which the piston 1 can impact onto the opposite cylinder cover 26, 27 on reaching its travel end position. The rubber elasticity of this buffer structure 85 effects an impact damping and therefore reduces the loading of the complete working cylinder. 2. For example, the buffer structure 85 consists of several projections which in particular are designed in a shape of a circular segment and are distributed around the piston longitudinal axis 12.

What is claimed is:

1. A piston for a fluid-actuated working cylinder, the piston comprising:
   a piston base unit which is coaxial to a piston longitudinal axis, consisting of a rigid core body which has a radial outer peripheral surface and an annular filling body which is seated in an annular receiving groove, said receiving groove being: coaxial to the piston longitudinal axis, in a region of the radial outer peripheral surface and designed with a radially outwardly facing groove opening in the core body;
   a ring element which consists of plastic, said ring element radially outwardly coaxially encompassing the piston base unit at least in the region of the filling body, being radially supported with a radial inner peripheral surface on the piston base unit, projecting radially beyond the radial outer peripheral surface of the core body and comprising an axially orientated axial support surface radially outside the piston base unit on its two axial face sides; and
   an annular enveloping body which has rubber elastic characteristics, coaxially encompassing a piston subassembly consisting of the piston base unit and the ring element and comprises two enveloping body end sections, each of which at least partially cover one of two axial end-faces of the core body which are axially opposite one another, as well as an enveloping body intermediate section which connects the two enveloping body end sections to one another radially outside the piston subassembly and herein bridges the ring element, wherein the enveloping body, given its primary shaping, is integrally formed onto the piston subassembly and is axially supported with respect to the piston subassembly by the two axial support surfaces of the ring element,
   wherein the ring element and the piston base unit overlap in the radial direction with respect to the piston longitudinal axis, in a manner such that the ring element in both axial directions of the piston longitudinal axis is supported by the piston base unit in an immovable and positive manner with respect to the piston base unit, and
   wherein the ring element at its radial outer side comprises a cylindrical outer radial support surface which faces radially outwards and onto which one of the two axially oriented axial support surfaces connects axially at both sides, and
   wherein the rubber-elastic enveloping body completely covers the ring element at the outer radial support surface and at the two axial support surfaces which are each designed annularly, wherein the enveloping body intermediate section forms a sleeve-like guide section which is radially supported all around the piston longitudinal axis by the outer radial support surface and which radially at the outside comprises a cylindrical piston guide surface which on use of the piston serves for piston guidance.

2. A piston according to claim 1, wherein the rubber-elastic enveloping body is integrally formed onto the piston subassembly in a direct manner without a bonding agent.

3. A piston according to claim 1, wherein the ring element in the axis direction of the piston longitudinal axis has a greater width than the groove opening of the receiving groove which is formed in the core body, wherein it axially projects beyond the groove opening of the receiving groove at both sides.

4. A piston according to claim 1, wherein the filling body is a ring magnet which serves for position detection on using the piston.

5. A piston according to claim 1, wherein the filling body is an injection moulded component which is produced in the receiving groove in a direct manner given its primary shaping.

6. A piston according to claim 1, wherein the core body consists of metal.

7. A piston according to claim 1, wherein the ring element is an injection moulded component which is integrally formed onto the piston base unit given its primary shaping.

8. A piston according to claim 1, wherein the radial overlapping between the ring element and the piston base unit which is responsible for the axially positive support is effected on the part of the piston base unit exclusively with respect to the filling body.

9. A piston according to claim 1, wherein the ring element, in the region of its radial inner peripheral surface, comprises at least one dual-acting support projection which extends around the piston longitudinal axis and with which it engages radially into a complementary annular-groove-shaped support deepening which is formed in the piston base unit in the region of the radial outer peripheral surface of the piston base unit, and by way of this experiences an axial positive support with respect to the piston base unit in simultaneously both axial directions of the piston longitudinal axis.

10. A piston according to claim 9, wherein the at least one dual-acting support projection is designed annularly in a closed manner.

11. A piston according to claim 9, wherein the annular-groove-shaped support deepening which interacts with the dual-acting support projection is formed in the filling body of the piston base unit, wherein it is narrower than the groove opening of the receiving groove.

12. A piston according to claim 9, wherein the ring element comprises a sleeve-like support section, on which the outer radial support surface and the two axial support surfaces are formed and on whose inner periphery the at least one dual-acting support projection is formed, wherein each dual-acting support projection is narrower in the axis direction of the piston longitudinal axis than the sleeve-like support section.

13. A piston according to claim 12, wherein the ring element has only a single dual-acting support projection which is placed centrally between the two axial support surfaces.

14. A piston according to claim 13, wherein the annular body of the ring element has a T-shaped cross section.

15. A piston according to claim 1, wherein the two enveloping body end sections are each designed in an annulus-shaped manner, wherein they comprise a buffer structure which serves for impact damping.

16. A piston according to claim 1, wherein the rubber-elastic enveloping body comprises two annular sealing sections which are coaxial to the piston longitudinal axis and between which the guide section extends and which expediently each form a radially deformable sealing lip.

17. A fluid-actuated working cylinder, with a cylinder housing, in which a cylinder chamber which is peripherally delimited by a piston running surface is formed, in said cylinder chamber the cylindrical piston guide surface of the piston according to claim 1 bears on the piston running surface in a slidingly displaceable manner, said piston being coupled in movement to a force output element which is accessible outside the cylinder chamber and subdividing the cylinder chamber into two working spaces, of which at least one can be impinged by a drive fluid in a controlled manner, in order to move the piston.

18. A piston for a fluid-actuated working cylinder, the piston comprising:
a piston base unit which is coaxial to a piston longitudinal axis, consisting of a rigid core body which has a radial outer peripheral surface and an annular filling body which is seated in an annular receiving groove, said receiving groove being: coaxial to the piston longitudinal axis, in a region of the radial outer peripheral surface and designed with a radially outwardly facing groove opening in the core body;
a ring element which consists of plastic, said ring element radially outwardly coaxially encompassing the piston base unit at least in the region of the filling body, being radially supported with a radial inner peripheral surface on the piston base unit, projecting radially beyond the radial outer peripheral surface of the core body and comprising an axially orientated axial support surface radially outside the piston base unit on its two axial face sides; and
an annular enveloping body which has rubber elastic characteristics, coaxially encompassing a piston subassembly consisting of the piston base unit and the ring element and comprises two enveloping body end sections, each of which at least partially cover one of two axial end-faces of the core body which are axially opposite one another, as well as an enveloping body intermediate section which connects the two enveloping body end sections to one another radially outside the piston subassembly and herein bridges the ring element, wherein the enveloping body, given its primary shaping, is integrally formed onto the piston subassembly and is axially supported with respect to the piston subassembly by the two axial support surfaces of the ring element,
wherein the ring element and the piston base unit overlap in the radial direction with respect to the piston longitudinal axis, in a manner such that the ring element in both axial directions of the piston longitudinal axis is supported by the piston base unit in an immovable and positive manner with respect to the piston base unit, and
wherein the ring element at its radial outer side comprises a cylindrical outer radial support surface which faces radially outwards and onto which one of the two axially oriented axial support surfaces connects axially at both sides, and
wherein the rubber-elastic enveloping body completely covers the ring element at the outer radial support surface and at the two axial support surfaces which are each designed annularly, wherein the enveloping body intermediate section forms a sleeve-like guide section which is radially supported all around the piston longitudinal axis by the outer radial support surface and which radially at the outside comprises a cylindrical piston guide surface which on use of the piston serves for piston guidance, and
wherein the ring element in the region of its radial inner peripheral surface comprises two single-acting support projections which are distanced to one another in the axis direction of the piston longitudinal axis, each extend about the piston longitudinal axis and delimit a radially inwardly open support space of the ring element, into which support space an annular outer section of the filling body which projects beyond the radial outer peripheral surface of the core body immerses, so that outer axial end-face sections of two axial end-faces of the filling body, said end-faces being opposite to one another and said end-face sections being located on this outer section, each experience an axially positive support in only one of the two axial directions of the piston longitudinal axis by one of the two single-acting support projections.

19. A piston according to claim 18, wherein the two single-acting support projections are each designed in an annularly closed manner.

20. A piston according to claim 18, wherein the ring element for the axially positive support with respect to the piston base unit comprises exclusively the two single-acting support projections, so that the annular body of the ring element has a U-shaped cross section.

21. A piston according to claim 18, wherein the ring element comprises the two single-acting support projections and axially therebetween a dual-acting support projection.

* * * * *